R. H. SPARKS.
MEANS FOR IMPROVING LAND.
APPLICATION FILED JUNE 29, 1912.
1,083,148.
Patented Dec. 30, 1913.
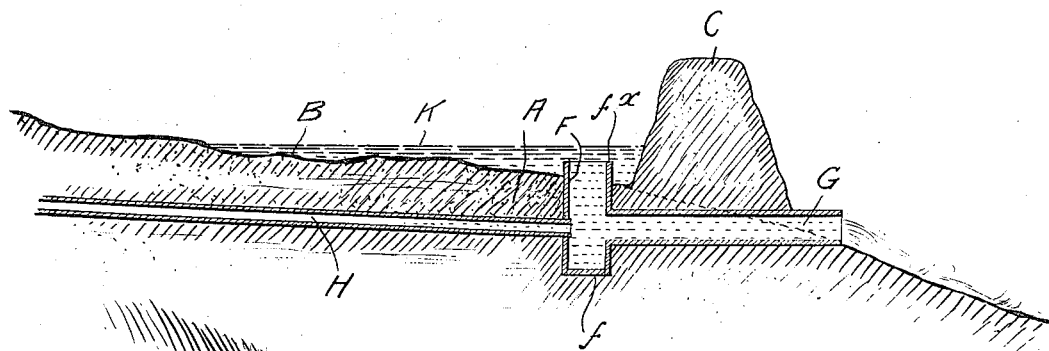
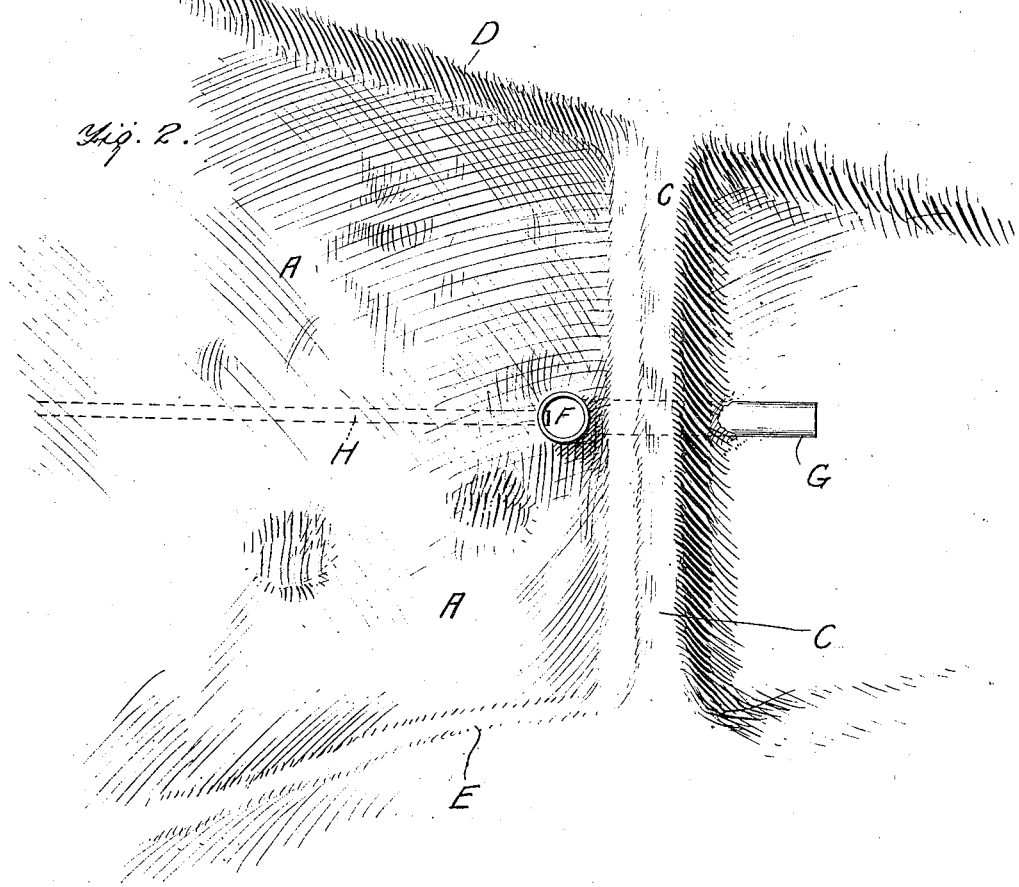
WITNESSES
INVENTOR
RALPH H. SPARKS,
BY
ATTORNEYS

UNITED STATES PATENT OFFICE.

RALPH H. SPARKS, OF TERRE HAUTE, INDIANA.

MEANS FOR IMPROVING LAND.

1,083,148.  Specification of Letters Patent.  Patented Dec. 30, 1913.

Application filed June 29, 1912.  Serial No. 706,569.

*To all whom it may concern:*

Be it known that I, RALPH H. SPARKS, a citizen of the United States, and a resident of Terre Haute, in the county of Vigo and State of Indiana, have made certain new and useful Improvements in Means for Improving Land, of which the following is a specification.

My invention relates to improvements in means for treating land subject to water erosion, and it consists in the combinations, constructions and arrangements herein described.

An object of my invention is to provide a device by means of which sloping land that is being eroded from storm water, may be made to receive deposits of silt at certain places, and to maintain cultivation when said deposits are being made.

A further object of my invention is to provide simple and inexpensive means for accomplishing the first named objects.

Other objects and advantages will appear in the following specification and the novel features of the device will be particularly pointed out in the appended claims.

My invention is illustrated in the accompanying drawings forming part of this application in which—

Figure 1 is a longitudinal section through a tract which is to be treated, and Fig. 2 is a plan view of said tract.

In carrying out my invention, I preferably make use of land which has a slope such as a valley or other suitable tract. Such a tract is shown at A.

In Fig. 1 the surface of the sloping land is denoted by B. At some suitable point on the sloping ground B, I construct a dam or dike like that shown at C in the drawings. This dam or dike may be made of any suitable material and is designed to check the flow of water down the inclined slope B. In Fig. 2, I have shown this dike C as extending from hills D and E on either side of the valley, so that the water which flows down the slope B may be impounded above the land A which is to be treated. On one side of the dike C I provide a downwardly extending drainage conduit F and connecting therewith a laterally extending conduit G, which empties on the opposite side of the dike from the land to be treated. Some distance below the top of the land to be reclaimed I provide auxiliary drain pipes such as those shown at H, these pipes leading into the drainage conduits F and G, as shown in the drawings. In the illustration the drainage conduit F is shown as a cylindrical pipe having a closed end $f$ disposed below the junction of the pipes or conduits G and H. The purpose of this construction is to permit the water to fall down the pipe F and to fill the pipe up to the junction of the pipe G, thereby providing a water cushion for other water which falls down pipe F.

From the foregoing description of the various parts of the arrangement the operation thereof may be readily understood.

The dike C is made high enough so as to prevent the water in times of flood from passing the dike. Any water which comes down will be checked therefore by the dike. The top $f^x$ of the conduit F is disposed normally below the flood or highest level of the water. In Fig. 1 this level is shown at K. Water at this level would flow into the pipe or conduit F, and thence by means of the conduit G would escape on the opposite side of the dike, thus lowering the level of the water to the top of the pipe F. The water remaining above the land A cannot flow out of the pipe F, but must seep through the land A and escape by means of the auxiliary conduit H, leaving a part of the silt or detritus which is carried down upon the land A from the higher land and forming the basis of soil which is highly suitable for cultivation. Now as the successive overflows occur through copious rains or melting snows, it is obvious that the silt will build up to the top of the pipe F. This may then be raised, care being taken to always keep the top of the pipe or conduit F above the level of the deposit and below the level of the dike.

The success of this method of treating land is in the provision of means for impounding flood waters and draining off the excessive floods through the overflow and permitting the remaining water to seep through the ground while the silt is deposited to form the land which is to be used for cultivation.

It is obvious that other forms of conduits than those shown in the illustration might be used without departing from the spirit and scope of the invention.

I claim:

1. In a means for improving a sloping tract of land, a dike disposed transversely of the tract for impounding water on the tract, a conduit for conducting flood water past the dam, an auxiliary conduit disposed beneath said tract of land and arranged to communicate with said first named conduit for draining the remaining impounded water, the upper end of said first named conduit being below the top of the dike and above the layer of silt deposited by the impounded water.

2. In a means for improving a sloping tract of land, a dike disposed transversely of the tract for impounding water on the tract, a conduit disposed below the surface of said tract and arranged to extend to the opposite side of said dike, a vertically extending conduit communicating with said first named conduit being normally open at its upper end and closed at its lower end and arranged to extend above the surface of said sloping tract, the upper end of said vertically extending conduit being below the level of the dike, and an auxiliary conduit disposed beneath said sloping tract and arranged to communicate with said vertically extending conduit.

3. In a means for improving a sloping tract of land, a dike disposed transversely of the tract for impounding water on the tract, a conduit disposed below the surface of said tract and arranged to extend to the opposite side of said dike, a vertically extending conduit communicating with said first named conduit being normally open at its upper end and closed at its lower end and arranged to extend above the surface of said sloping tract, the upper end of said vertically extending conduit being below the level of the dike, and an auxiliary conduit disposed beneath said sloping tract and arranged to communicate with said vertically extending conduit above the bottom of the latter, the mouth of said auxiliary conduit being substantially on a level with the intake end of said first named conduit, thereby providing a water cushion at the bottom of said vertically disposed conduit.

RALPH H. SPARKS.

Witnesses:
  GEO. S. LIVINGSTON,
  L. V. STANLEY.